(12) United States Patent
Ishii

(10) Patent No.: US 6,295,966 B1
(45) Date of Patent: Oct. 2, 2001

(54) IDLING CONTROL SYSTEM FOR INTERNAL COMBUSTION ENGINE

(75) Inventor: Hitoshi Ishii, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/501,298

(22) Filed: Feb. 9, 2000

(30) Foreign Application Priority Data

Feb. 9, 1999 (JP) .................................................. 11-031686

(51) Int. Cl.[7] ........................................................ F02D 1/00
(52) U.S. Cl. .................................. 123/339.11; 123/339.12
(58) Field of Search ............................ 123/339.11, 339.12

(56) References Cited

U.S. PATENT DOCUMENTS

| | | | |
|---|---|---|---|
| 6,009,851 | * | 1/2000 | Iida et al. .......................... 123/339.12 |
| 6,092,018 | * | 7/2000 | Puskorius et al. ............... 123/339.11 |
| 6,152,105 | * | 11/2000 | Nishimura et al. ............. 123/339.11 |
| 6,209,517 | * | 4/2001 | Yasui ................................ 123/339.11 |

FOREIGN PATENT DOCUMENTS 5-141336   6/1993   (JP) .

* cited by examiner

*Primary Examiner*—John Kwon
(74) *Attorney, Agent, or Firm*—Foley & Lardner

(57) ABSTRACT

An idling control system for a two-plug type internal combustion engine is comprised of an idling detector, an engine rotation speed detector and a controller coupled to the detectors. The controller decides whether the engine rotation speed in idling is smaller than an idling speed by a predetermined value. When this decision is affirmative, the controller differentiates ignition timings of the two spark plugs of each cylinder. This arrangement enables the engine with this system to perform preferable idling performances of generating a torque in response to the input of the external torque and of continuing the combustion against the drop of the engine rotation speed.

11 Claims, 6 Drawing Sheets

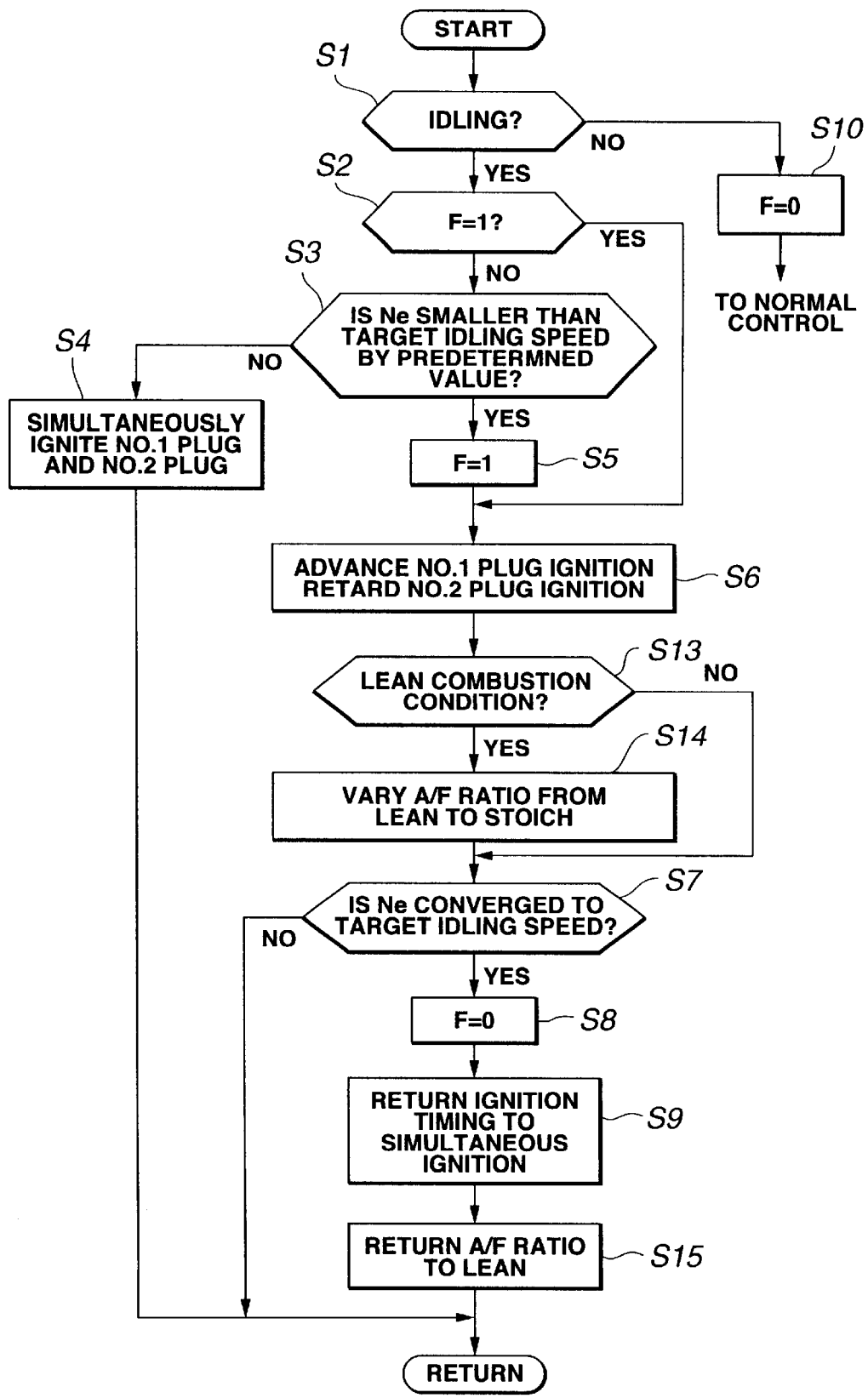

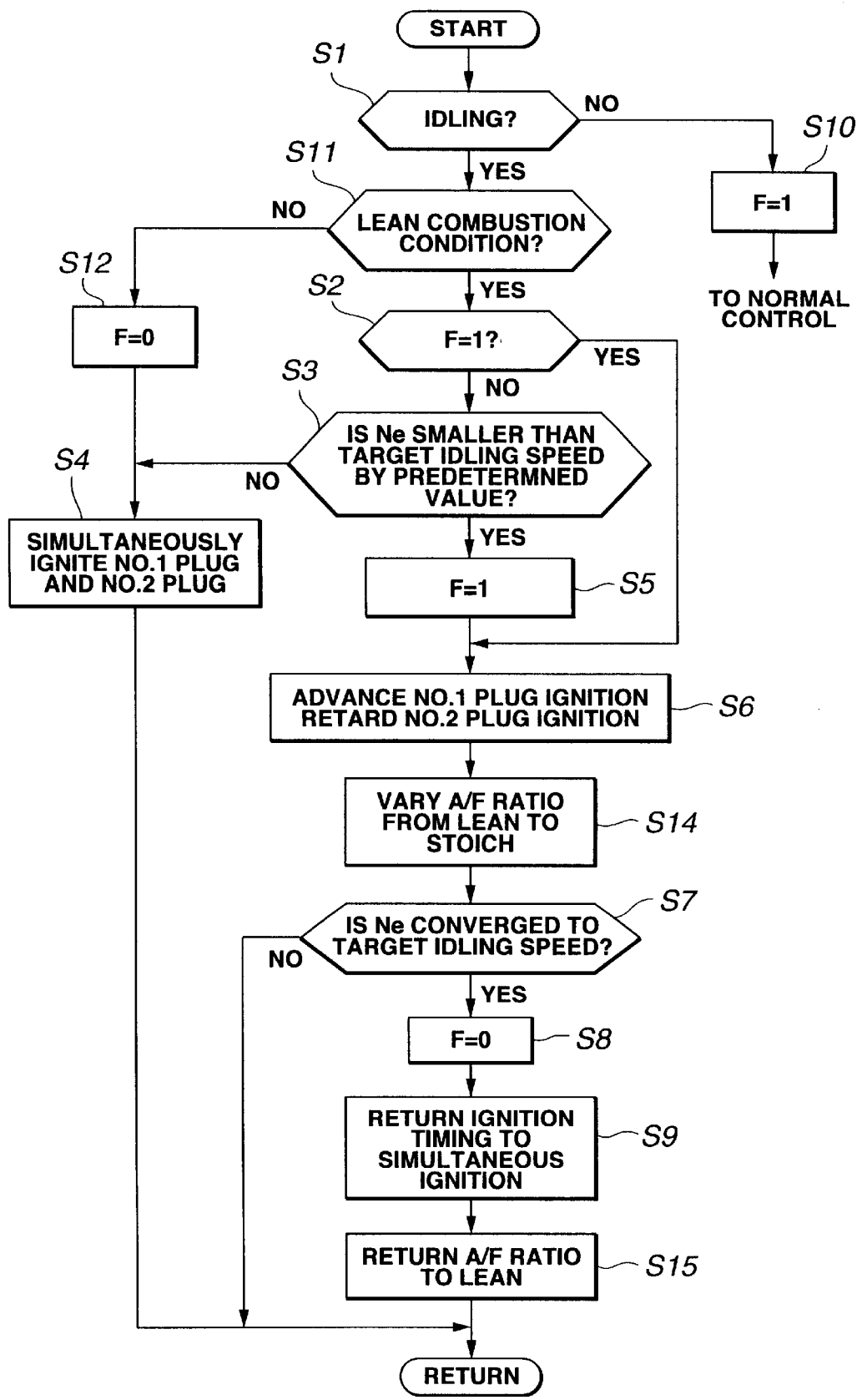

IDLING CONTROL SYSTEM FOR INTERNAL COMBUSTION ENGINE

BACKGROUND OF THE INVENTION

The present invention relates an idling control system for an internal combustion engine of a type having two spark plugs by each cylinder.

In order to improve ignition performance and combustion speed of an internal combustion engine, various control systems have been proposed. Japanese Patent Provisional Publication No. 5-141336 discloses an engine control system for an internal combustion engine provided with two plugs for each cylinder. This conventional engine control system is arranged to select one of a one plug ignition mode and a two plug ignition mode according to the engine operating condition in order to improve a stability of engine combustion.

SUMMARY OF THE INVENTION

However, even when the two plug ignition mode is selected, two spark plugs of each cylinder are simultaneously ignited by this conventional engine control system. Although this simultaneous ignition timing effectively functions to ensure the stability of the engine combustion, the conventional engine control system still has a difficulty in satisfying both of increasing an engine torque and stably maintaining the engine combustion when the engine is operating in idling and when an engine speed is decreased due to an external load. More specifically, although the increase of the engine torque is ensured by advancing a simultaneous ignition timing of the two spark plugs, there is a possibility that the combustion becomes unstable due to the increase of time period for combustion stroke caused by the decrease of the engine speed. On the other hand, if the simultaneous ignition timing is retarded, the convergence of the engine speed to a target engine speed is delayed due to the shortage of engine torque although the combustion of the engine is maintained. Furthermore, when the engine is put in a lean combustion condition where an air-fuel ratio is set at a lean side as compared with a stoichiometric ratio (theoretical ratio) so as to improve fuel consumption, the above-mentioned trouble is significantly caused.

It is therefore an object of the present invention to provide an improved idling control system which preferably satisfies both of increasing an engine torque and stably maintaining the engine combustion when the engine is operating in idling and when an engine speed is decreased due to an external load.

An idling control system according to the present invention is for an internal combustion engine which has two spark plugs by each cylinder. The idling control system comprises an idling detector which detects that the engine is put in idling, an engine rotation speed detector which detects an engine rotation speed of the engine and a controller which is coupled to the idling detector and the engine rotation speed detector. The controller is programmed to decide on the basis of a engine rotation speed indicative signal of the engine rotation speed detector and an idling indicative signal of the idling detector whether the engine rotation speed in idling is smaller than an idling speed by a predetermined value and to differentiate ignition timings of the two spark plugs of each cylinder when the controller decides that the engine rotation speed in idling is smaller than the idling speed by the predetermined value.

BRIEF DESCRIPTION OF THE DRAWINGS

FIG. 5 is a flowchart showing the ignition timing control routine of a third embodiment.

FIG. 6 is a flowchart showing the ignition timing control routine of a fourth embodiment.

DETAILED DESCRIPTION OF THE INVENTION

Figure 1:
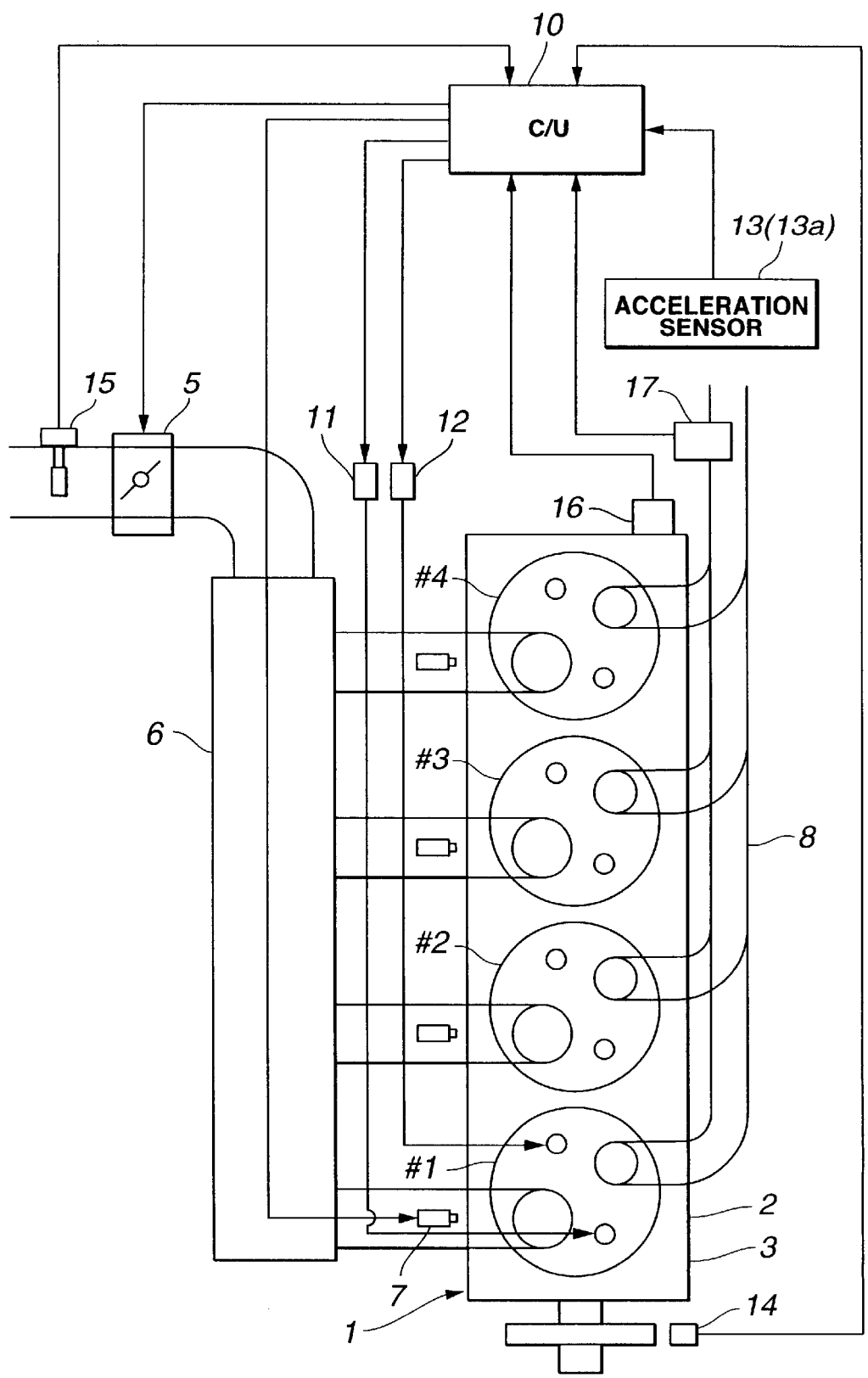
FIG. 1 is a schematic view showing an idling control system of a first embodiment according to the present invention.
Figure 2:
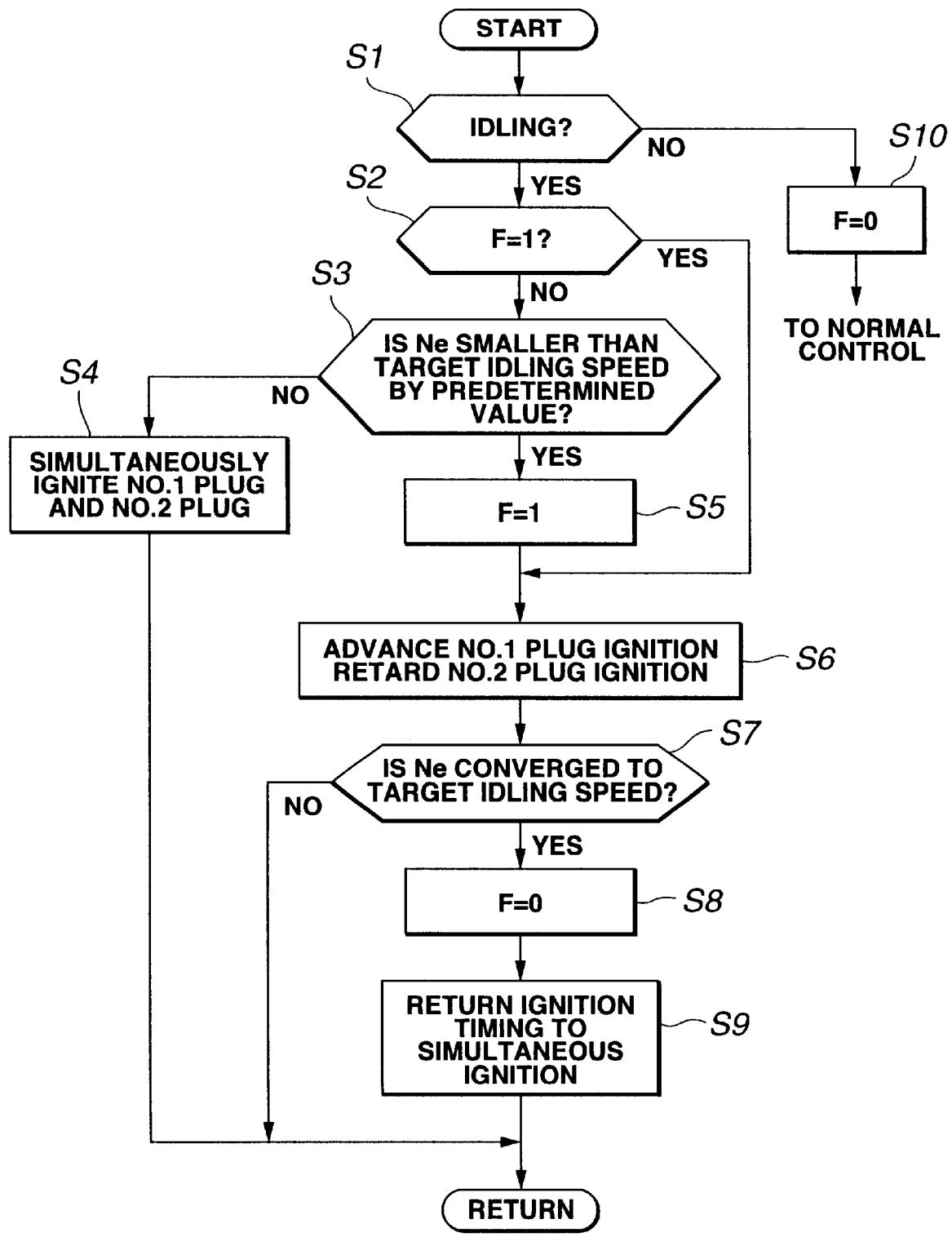
FIG. 2 is a flowchart showing an ignition timing control routine of the first embodiment.
Figure 3:
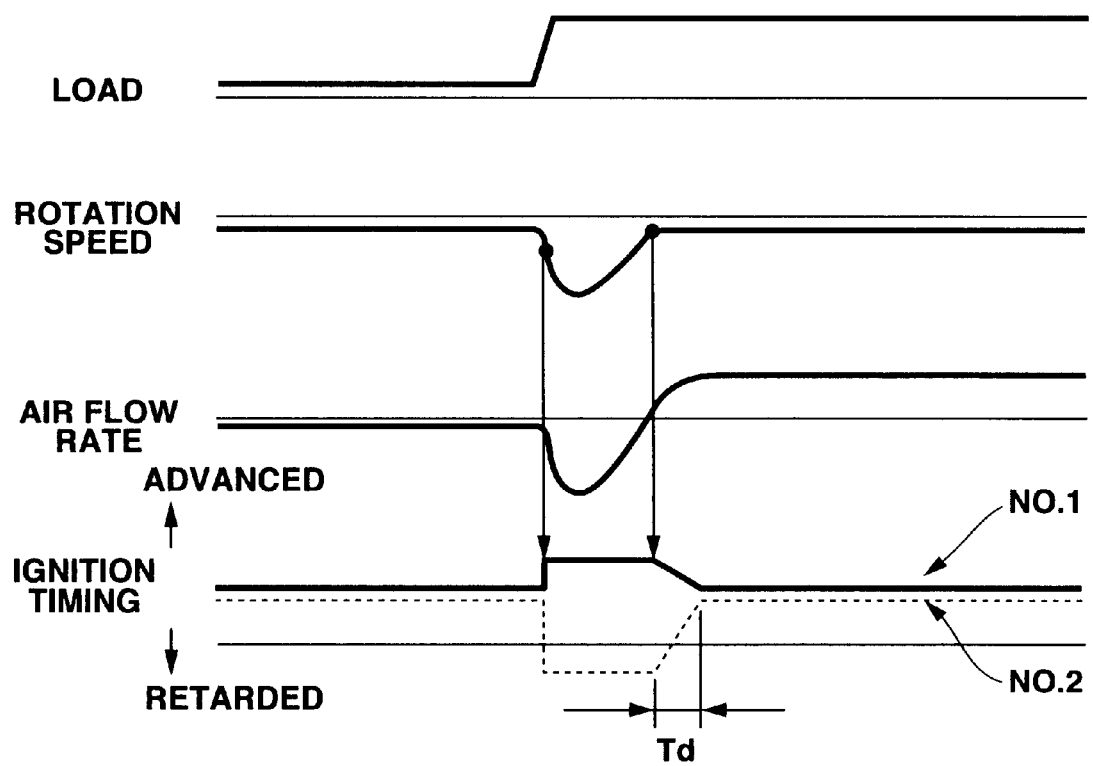
FIG. 3 is a time chart showing operations of the engine in response to receiving external load according to the first embodiment.

Referring to FIGS. 1 to 3, there is shown a first embodiment of an idling control system for an internal combustion engine 1 according to the present invention.

As shown in FIG. 1, the internal combustion engine 1 has four cylinders #1, #2, #3 and #4. Each of the four cylinders #1, #2, #3 and #4 has a combustion chamber 2 where first and second spark plugs 3 and 4 are provided. Each combustion chamber 2 is connected to a branch portion 6a of an intake manifold 6 and a branch portion 8a of an exhaust manifold 8. An electric throttle valve 5 is disposed upstream of the intake manifold 6 and controls the amount of intake air to be supplied to each combustion chamber 2 of the engine 1 through the intake manifold 6. An electromagnetic fuel injection valve 7 is installed to each branch portion 6a of the intake manifold 6 for each cylinder #1 (#2, #3, #4). Fuel is injected from the fuel injection valve 7 to each cylinder #1 (#2, #3, #4) at a predetermined timing synchronized with the engine rotation. The injected fuel is mixed with the air to form air-fuel mixture in the combustion chamber 2 and is combusted by the ignition of the first and second spark plugs 3 and 4. Exhaust gas caused by the combustion of air-fuel mixture in the combustion chamber 2 is exhausted through the exhaust manifold 8.

A control unit (controller) 10 comprises a microcomputer basically constituted by CPU, ROM, RAM, A/D converter, and Input/Output interface. The control unit 10 is coupled to various sensors and receives various input signals for detecting information indicative of vehicle condition. The control unit 10 calculates operation quantities of the electronically controlled throttle valve 5, the fuel injection valves 7 and the first and second spark plugs 3 and 4 on the basis of the obtained input signals indicative of the vehicle condition. That is, the control unit 10 controls the operations of the electronically controlled throttle valve 5 and the fuel injection valves 7 and controls the operations of the first and second spark plugs 3 and 4 through first and second ignition coils 11 and 12, respectively.

The various sensors include an acceleration sensor 13 for detecting an acceleration opening APO indicative of a depression amount of an accelerator pedal, a crank angle sensor 14 for detecting a rotation of the engine 1 so as to be able to detect an engine rotation speed Ne, an airflow meter 15 for detecting an intake airflow rate Qa at a position upstream of the throttle valve 5 a water temperature sensor 15 for detecting a cooling water temperature Tw of the engine 1, an air-fuel ratio sensor 17 for detecting an exhaust air-fuel ratio (oxygen concentration) at a collector portion of the exhaust manifold 8. The acceleration sensor 13 comprises an idling switch 13a which is turned on when an acceleration pedal is not depressed.

Although in FIG. 1 reference numerals of the combustion chamber 2, the first and second spark plugs 3 and 4, the fuel injection valve 7 and the first and second ignition coils 11 and 12 are indicated to parts of only the first cylinder #1, the other cylinders #2, #3 and #4 are similarly constituted as same as the explained cylinder #1. Further, although the ignition coils 11 and 12 for the other spark plugs 3 and 4 of the other cylinders #2, #3 and #4 are not shown in FIG. 1 to facilitate the explanation and the drawing, the spark plugs 3 and 4 of the other cylinder #2, #3 and #4 are connected to a control unit 10 through the ignition coils 11 and 12.

As to a control of the electronically controlled throttle valve 5, the explanation will be made. The control unit 10 sets a target throttle opening TTVO on the basis of the acceleration opening APO and controls the throttle valve 5 to adjust an actual throttle opening TVO of the throttle valve 5 to the target throttle opening TTVO. When the engine 1 is put in the idling operation, the throttle opening TVO is controlled so as to adjust the actual engine rotation speed Ne at a target idling speed (idling engine speed control) by comparing the actual engine rotation speed Ne with the target idling engine rotation speed. Although the first embodiment has been shown and described to employ the electronically control throttle valve 5, it will be understood that a mechanical throttle valve connected to an acceleration pedal through a wire may be employed. In such a case, an idling control valve is installed at a bypass passage of the throttle valve and the idling engine speed control is executed by controlling the idling control valve.

As to a control of the fuel injection valve 7, the explanation will be made. The control unit 10 calculates a basic fuel injection mount corresponding to a stoichiometric air-fuel ratio on the basis of the intake airflow rate Qa and the engine rotation speed Ne. Further, the control unit 10 corrects the basic fuel injection mount with an air-fuel ratio correction coefficient corresponding to the target air-fuel ratio determined according to the engine operating condition. Consequently, the control unit 10 determines a final fuel injection amount on the basis of the correction coefficient and outputs an injection pulse signal having a pulse width corresponding to the final fuel injection amount to each fuel injection valve 7.

Next, the control of the spark plugs 3 and 4 will be discussed with reference to a flowchart of FIG. 2. This flowchart shows an ignition timing control routine of the first embodiment according to the present invention, and this control routine is executed at predetermined time intervals or predetermined engine rotations.

At a step S1, the control unit 10 decides on the basis of a signal of the idling switch 13a whether the engine 1 is put in an idling operation or not. When the decision at the step S1 is negative, the routine jumps to a step S10 where the control unit 10 sets a rotation drop flag F at zero (F=0) and jumps then to a normal control routine. A detailed explanation of the normal control will be omitted herein. Briefly saying, a control for selecting one of a one-plug ignition mode and a two-plug simultaneous ignition mode is executed by the normal control.

When the decision at the step S1 is affirmative, the routine proceeds to a step S2. At the step S2, the control unit 10 decides whether the rotation drop flag F is set at 1 or not. When the decision at the step S2 is affirmative, the routine jumps to a step S6. When the decision at the step S2 is negative, that is, the rotation drop flag F is set at zero (F=0), the routine proceeds to a step S3.

At the step S3, the control unit 10 decides whether the drop of the engine rotation speed Ne is generated by an external load. More specifically, the control unit 10 decides whether or not the engine rotation speed Ne is smaller than the target idling speed by a predetermined value. This step S3 corresponds to a rotation drop detecting means. When the decision at the step S3 is negative, that is, when the drop of the engine rotation speed Ne is not generated, the routine proceeds to a step S4 wherein the control unit 10 selects a simultaneous ignition mode for simultaneously ignite the first and second spark plugs 3 and 4 and then terminates this routine.

When the decision at the step S3 is affirmative, the routine proceeds to a step S5 wherein the control unit 10 sets the rotation drop flag at 1 (F=1), and the routine then proceeds to a step S6. Therefore, in the next routine after F=1, the decision at the step S2 is affirmative and therefore the next routine jumps from the step S2 to the step S6.

At the step S6, the control unit 10 selects a differentiated ignition mode by which the ignition timing of the first spark plug 3 is advanced and the ignition timing of the second spark plug 4 is retarded to a timing after a top death center (TDC). This step corresponds to an ignition timing differentiating means.

At a step S7 following to the execution of the step S6, the control unit 10 decides whether the engine rotation speed Ne is converged to a target rotation speed or not. More specifically, the control unit 10 decides whether the engine rotation speed Ne is recovered to the target idling speed.

When the decision at the step S7 is negative, the routine proceeds to a return step to terminate the present routine while maintaining the differentiated ignition mode. That is, as shown in FIG. 3, when the engine 1 is operated in idling and when the engine rotation speed is decreased by applying the external load to the engine 1, the differentiated ignition mode is selected to differentiate the ignition timings of the first and second spark plugs 3 and 4. More specifically, the ignition timing of the first spark plug 3 is advanced and the ignition timing of the second plug 4 is retarded at a timing after TDC. This differentiated ignition mode ensures both of an ignition timing for generating a torque against the external load and an ignition timing for maintaining the combustion against the drop of the engine rotation speed corresponding to the elongation of the combustion period. Therefore, the thus arranged idling control system of the first embodiment according to the present invention satisfies the torque increasing performance against the input of the external load and a preferable idling for maintaining a combustion against the drop of the idling speed.

Although the intake airflow rate is decreased according to the drop of the engine rotation speed Ne, the throttle opening TVO of the electronically controlled throttle valve 5 is increased by the idling rotation speed control function. Therefore, the intake airflow rate is gradually increased so as to improve the drop of the engine rotation speed.

When the decision at the step S7 is affirmative, the routine proceeds to a step S8 wherein the control unit 10 resets the rotation drop detection flag F at zero (F=0). Thereafter, the routine proceeds to a step S9 wherein the control unit 10 selects the simultaneous ignition mode to return the ignition timing from the differentiated ignition mode to the simultaneous ignition mode. Then, the present routine is terminated.

When the ignition mode is returned to the simultaneous ignition mode, the ignition timing is gradually returned to the simultaneous ignition within a period Td as shown in FIG. 3.

Figure 4:
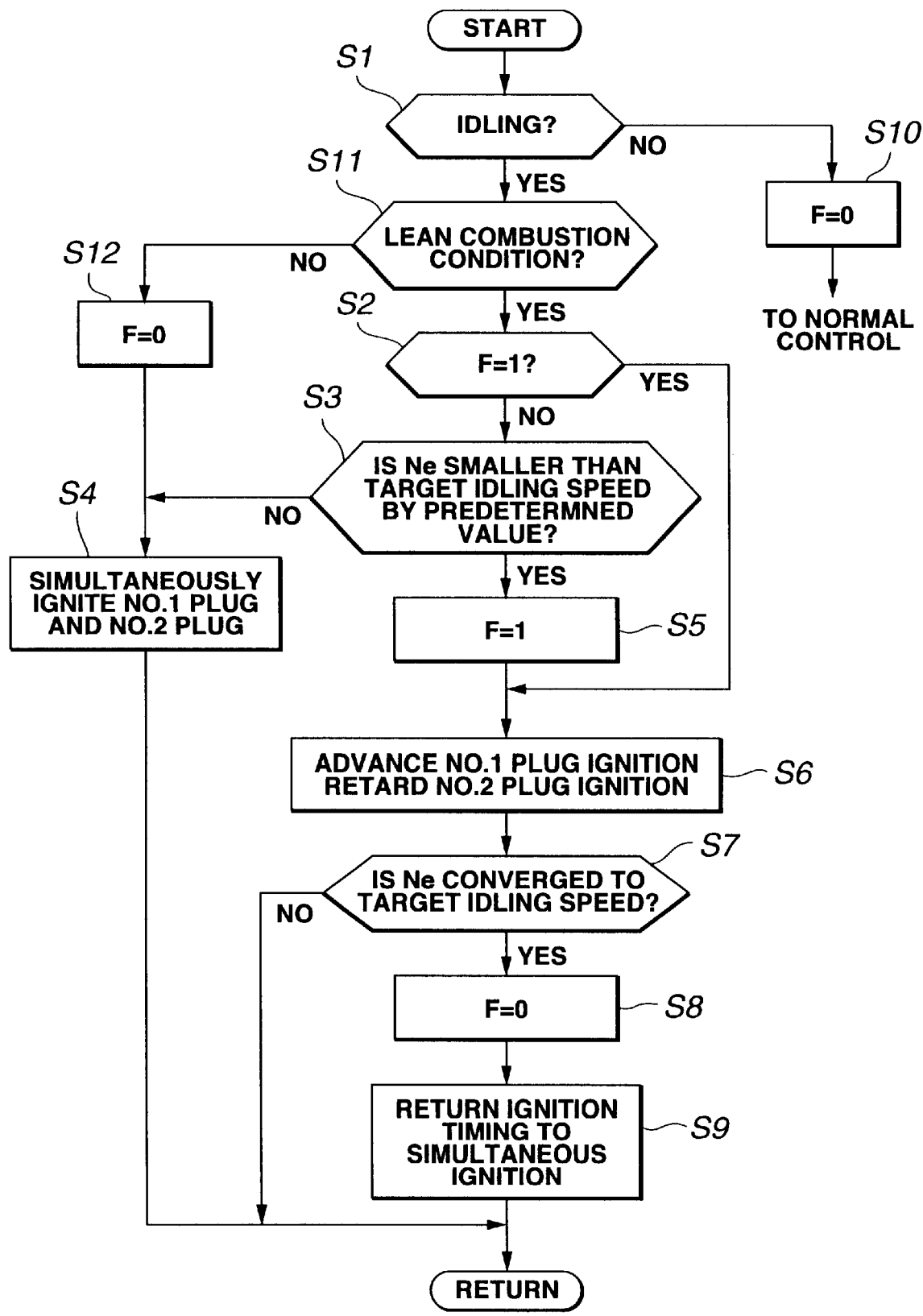
FIG. 4 is a flowchart showing the ignition timing control routine of a second embodiment.

Referring to FIG. 4, a second embodiment of the idling control system according to the present invention will be discussed. The engine arrangement of the second embodiment is the same as that of the first embodiment shown in FIG. 1, and only the ignition timing control routine for the idling control of the second embodiment is different from that of the first embodiment as shown in a flowchart of FIG. 4. Therefore, only the explanation of the ignition timing control routine will be discussed with reference to the flowchart of FIG. 4.

This ignition timing control routine of the second embodiment is programmed to select the differentiated ignition mode when the engine is operated in a lean combustion mode under idling and when the engine rotation speed is decreased by receiving the external load. Major part of the flowchart of FIG. 4 is the same as that of the flowchart of FIG. 2 of the first embodiment except that step S11 and S12 are further added in the flowchart of FIG. 4. As to the newly added steps, the explanation will be made.

As is clear from the flowchart of FIG. 4, the step S11 for deciding whether the engine 1 is put in a lean combustion condition is added between the step S1 and the step S2. More specifically, when the decision at the step S1 is affirmative, that is, when the engine 1 is put In the idling, the routine proceeds to the step S2.

At the step S11, the control unit 10 decides whether the engine 1 is put In a lean combustion condition or not. When the decision at the step S11 is affirmative, the routine proceeds to the step S2 for deciding whether F=1 or not. When the decision at the step S12 is negative, the routine proceeds to the step S12 wherein the rotation drop flag F is reset at zero (F=0).

Following to the execution of the step S12, the routine proceeds to the step S4 wherein the simultaneous ignition mode is selected to simultaneously ignite the first and second spark plugs 3 and 4.

By the execution of the steps following to the step S2, when the engine 1 is operated In the lean combustion mode during idling and when the drop of the engine rotation speed is detected, the differentiated ignition mode is selected to differentiate the ignition timings of the first and second spark plugs 3 and 4. This arrangement of the second embodiment according to the present invention enables operations of the engine 1 to be adapted to the drop of the idling speed due to the external load during the lean combustion of the engine 1.

Referring to FIG. 5, a third embodiment of the idling control system according to the present invention will be discussed. The engine arrangement of the third embodiment is the same as that of the first embodiment, and only the ignition timing control routine for the idling control of the third embodiment is different from that of the first embodiment as shown in a flowchart of FIG. 5. Therefore, only the explanation of the ignition timing control routine will be discussed with reference to the flowchart of FIG. 5.

This ignition timing control routine is programmed to select the differentiated ignition mode when the engine rotation speed in idling is decreased by receiving the external load and to control the air-fuel ratio at the stoichiometric ratio when the engine 1 is operated in idling and the lean combustion and when the engine rotation speed is decreased by receiving the external load. Major steps of the flowchart of FIG. 5 are the same as those of the flowchart of FIG. 2 of the first embodiment except that steps S13, S14 and S15 are further added in the flowchart of FIG. 5. The step S13 for deciding whether the engine 1 is operating in the lean combustion condition is added to immediately follow to the step S6. The step S14 for varying the air-fuel ratio from the lean ratio to the stoichiometric ratio is added to immediately follow to the affirmative decision of the step S13. The step S15 for returning the air-fuel ratio to the lean ratio is added to immediately follow to the step S9. As to the newly added steps, the explanation will be mainly made.

Practically, when the engine rotation speed Ne in idling is decreased by the external load, the differentiated ignition mode is selected at the step S6 to differentiate the ignition timings of the first and second spark plugs 3 and 4, and in this condition, the control unit 10 decides at the step S13 whether the engine 1 is operating in the lean combustion condition. Further, when the decision at the step S13 is affirmative, the routine proceeds to the step S14 wherein the control unit 10 controls the air-fuel ratio at the stoichiometric ratio to vary the air-fuel ratio from the lean ratio to the stoichiometric ratio. This step corresponds to a stoichiometric ratio control means.

When the engine rotation speed Ne is converged to a target rotation speed, the ignition mode is returned to the simultaneous ignition mode at the step S9, and the air-fuel ratio is returned to the lean combustion ratio at the step S15.

With the thus arranged third embodiment according to the present invention, it is possible to firmly adapt the operation of the engine 1 to the drop of the engine rotation speed due to the external load when the engine rotation speed Ne in idling is decreased during the lean combustion of the engine 1.

Referring to FIG. 6, a fourth embodiment of the idling control system according to the present invention will be discussed. The engine arrangement of the fourth embodiment is the same as that of the first embodiment, and only the ignition timing control routine for the idling control of the fourth embodiment is different from that of the first embodiment as shown in a flowchart of FIG. 6. Therefore, only the explanation of the ignition timing control routine will be discussed with reference to the flowchart of FIG. 6.

This control routine shown in FIG. 6 is programmed to select the differentiated ignition mode and control the air-fuel ratio at the stoichiometric ratio when the engine 1 is operated in a lean combustion condition and in idling and when the engine rotation speed Ne is decreased by receiving the external load. Major steps of the flowchart of FIG. 6 are the same as those of the flowchart of FIG. 2 of the first embodiment except that step S11, S12, S14 and S15 are further added in the flowchart of FIG. 6. More specifically, the flowchart of FIG. 6 is constituted by adding the steps S14 and S15 to the flowchart of FIG. 4 of the second embodiment.

As is clear from the flowchart of FIG. 6, the step S11 for deciding whether the engine 1 is put in the lean combustion condition is added between the step S1 and the step S2. Accordingly, when the decision at the step SI is affirmative, that is, when the engine 1 is put in idling, the routine proceeds to the step S11.

At the step S11, the control unit 10 decides whether the engine 1 is put in the lean combustion condition or not. When the decision at the step S11 is affirmative, the routine proceeds to the step S2 for deciding whether F=1 or not. When the decision at the step S11 is negative, the routine proceeds to the step S12 wherein the rotation drop flag F is reset at zero (F=0).

Following to the execution of the step S12, the routine proceeds to the step S4 wherein the control unit 10 selects the simultaneous ignition mode to simultaneously ignite the first and second spark plugs 3 and 4. Thereafter, the routine is terminated.

By the execution of the steps following to the step S2, when the engine 1 is operating in the lean combustion condition and in idling and when the drop of the engine rotation speed Ne is detected by the external load, the control unit 10 selects the differentiated ignition mode to differentiate the ignition timings of the first and second spark plugs 3 and 4 at the step S6. Further, under such an engine condition that the engine 1 is operating in the lean combustion condition and in idling and the drop of the engine rotation speed Ne is detected by the external load, the routine proceeds to the step S14 wherein the control unit 10 controls the air-fuel ratio at the stoichiometric ratio to vary the air-fuel ratio from the lean ratio to the stoichiometric ratio. This step corresponds to stoichiometric ratio control means.

When the engine rotation speed Ne is converged to a target rotation speed, the ignition mode is returned to the simultaneous ignition mode at the step S9, and the air-fuel ratio is returned to the lean combustion ratio by the execution of the step S15.

With the thus arranged fourth embodiment according to the present invention, it becomes possible that the operation of the engine 1 is preferably adapted to the drop of the idling speed due to the external load during the lean combustion of the engine 1.

The idling control system according to the present invention is arranged to differentiate the ignition timings of two spark plugs of each cylinder. More specifically, the simultaneous ignition timing is differentiated into an advanced ignition timing for generating a torque in response to the input of the external torque and a retarded ignition timing for continuing combustion against the elongation of combustion period due to the drop of the engine rotation speed. Therefore, the engine with the idling control system according to the present invention performs preferable idling performances to generate a torque in response to the input of the external torque and to continue the combustion against the drop of the engine rotation speed.

The entire contents of Japanese Patent Applications No. 11-31686 filed on Feb. 9, 1999 in Japan are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. An idling control system for an internal combustion engine, the engine having two spark plugs by each cylinder, said idling control system comprising:
   an idling detector detecting that the engine is put in idling;
   an engine rotation speed detector detecting an engine rotation speed of the engine;
   a controller coupled to said idling detector and said engine rotation speed detector, said controller being programmed to decide on the basis of an engine rotation speed indicative signal of said engine rotation speed detector and an idling indicative signal of said idling detector whether the engine rotation speed is smaller than an idling speed by a predetermined value and to differentiate ignition timings of the two spark plugs of each cylinder when said controller decides that the engine rotation speed in idling is smaller than the idling speed by the predetermined value.

2. An idling control system as claimed in claim 1, further comprising an air-fuel ratio detector for detecting an exhaust air-fuel ratio, said air-fuel ratio detector being coupled to said controller.

3. An idling control system as claimed in claim 2, wherein said controller differentiates the ignition times of the two spark plugs of each combustion chamber when said controller decides on the basis of an air-fuel ratio indicative signal of said air-fuel ratio detector that the engine is put in a lean condition where an air fuel ratio is leaner than a stoichiometric ratio and when the engine rotation speed in idling is smaller than the idling speed by the predetermined value.

4. An idling control system as claimed in claim 2, wherein said controller varies an air fuel ratio to a stoichiometric ratio when the engine is put in a lean condition where an air fuel ratio is leaner than the stoichiometric ratio and when the engine rotation speed is smaller than the idling engine speed by the predetermined value.

5. An idling control system as claimed in claim 1, wherein said controller differentiates the ignition timings of the two plugs of each combustion chamber by advancing the ignition timing of the one plug and by retarding the ignition timing of the other plug.

6. An idling control system as claimed in claim 5, wherein the retarded ignition timing of the other plug is later than a top death center.

7. An idling control system as claimed in claim 1, further comprising an ignition coil for each spark plug, said controller sending a control signal to the ignition coil to vary the ignition timing of the spark plug.

8. An idling control system as claimed in claim 5, wherein the advanced ignition timing and the retarded ignition timing are gradually returned to a normal timing when the engine rotation speed is converged to a target idling engine rotation speed.

9. An idling control system as claimed in claim 7, wherein said controller simultaneously ignites the two spark plugs of each cylinder through the ignition coil when the engine operates in idling and when the-engine rotation speed is not smaller than the idling speed by the predetermined value.

10. An idling control system for an internal combustion engine, the engine having two spark plugs by each cylinder, said idling control system comprising:
    engine speed drop detecting means for detecting an engine speed drop which is caused by applying an external load to the engine when the engine is operated in idling; and
    ignition timing differentiating means for differentiating ignition timings of the two spark plugs of each cylinder when said engine speed drop detecting means detects the engine speed drop.

11. A method for controlling an idling speed of an internal combustion engine, the engine having two spark plugs by each cylinder, said method comprising:
    detecting an engine speed drop which is caused by applying an external load to the engine when the engine is operated in idling; and
    differentiating ignition timings of the two spark plugs of each cylinder when said engine speed drop detecting means detects the engine speed drop.

* * * * *